(12) United States Patent
Falkiner et al.

(10) Patent No.: US 8,080,087 B2
(45) Date of Patent: Dec. 20, 2011

(54) SALT DRYING PROCESS

(75) Inventors: Robert J. Falkiner, Ontario (CA); Bal K. Kaul, Fairfax, VA (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 485 days.

(21) Appl. No.: 12/289,293

(22) Filed: Oct. 24, 2008

(65) Prior Publication Data

US 2009/0133577 A1 May 28, 2009

Related U.S. Application Data

(60) Provisional application No. 60/996,600, filed on Nov. 27, 2007.

(51) Int. Cl.
*B01D 53/26* (2006.01)

(52) U.S. Cl. ............ 95/94; 95/24; 95/188; 95/189; 95/196; 95/205; 95/206; 95/231; 96/135; 96/234; 96/240; 96/245

(58) Field of Classification Search .......... 95/152, 95/24, 95; 208/188; 96/117, 120, 151, 396, 96/412
See application file for complete search history.

(56) References Cited

U.S. PATENT DOCUMENTS

| | | | | |
|---|---|---|---|---|
| 2,151,248 A | * | 3/1939 | Vaughan | 62/632 |
| 2,305,323 A | * | 12/1942 | Savelli | 208/188 |
| 2,356,890 A | * | 8/1944 | Schulze | 208/188 |
| 2,804,940 A | * | 9/1957 | Hutchinson | 95/91 |
| 2,916,103 A | * | 12/1959 | Daugherty | 96/120 |
| 3,071,541 A | * | 1/1963 | Stenzel | 208/188 |
| 3,615,723 A | * | 10/1971 | Meade | 426/294 |
| 3,616,460 A | * | 10/1971 | Watson et al. | 204/665 |
| 4,052,491 A | * | 10/1977 | Lefevre | 261/112.2 |

(Continued)

FOREIGN PATENT DOCUMENTS

GB 1240072 A1 7/1971

OTHER PUBLICATIONS

International Search Report, PCT/US2008/013005, mailed Mar. 17, 2009.

(Continued)

*Primary Examiner* — Duane Smith
*Assistant Examiner* — Ives Wu
(74) *Attorney, Agent, or Firm* — Glenn T. Barrett; Malcolm D. Keen

(57) ABSTRACT

A method of drying liquid and gaseous hydrocarbons by contacting a feed stream of the hydrocarbon with an aqueous solution of a salt drying agent prior to passing the stream through a salt dryer to remove part of the water in the stream. The aqueous solution of the salt drying agent is generated in the salt dryer when the partly dried stream comes into contact with the drying salt and forms the solution. The solution is circulated in a loop from the salt dryer to the incoming feed and then through a liquid/liquid coalescer which removes a portion of the water together with dissolved salt from the mixture before the mixture is passed on to the salt dryer where further removal of water occurs. The salt dryer is off-loaded by a substantial factor by the initial partial dehydration and does not require to remove such a large amount of water; the salt consumption is therefore reduced in proportion to the amount of water removed in the treatment steps which precede the dryer.

19 Claims, 2 Drawing Sheets

U.S. PATENT DOCUMENTS

| | | | | |
|---|---|---|---|---|
| 4,518,396 | A * | 5/1985 | Rawson | 48/127.3 |
| 4,716,074 | A * | 12/1987 | Hurley et al. | 428/220 |
| 4,759,782 | A * | 7/1988 | Miller et al. | 55/487 |
| 5,443,724 | A * | 8/1995 | Williamson et al. | 210/323.2 |
| 6,422,396 | B1 * | 7/2002 | Li et al. | 210/489 |
| 6,453,576 | B2 * | 9/2002 | Smith et al. | 34/343 |
| 6,553,784 | B2 * | 4/2003 | Lu | 62/632 |
| 7,008,464 | B2 * | 3/2006 | Deetz | 95/24 |
| 7,691,258 | B2 * | 4/2010 | Venkateshan | 208/299 |
| 2003/0091489 | A1 * | 5/2003 | Hommeltoft | 423/210 |

OTHER PUBLICATIONS

Written Opinion, PCT/US2008/013005, mailed Mar. 17, 2009.
Art Gardner, Refining Details: Advances in Liquid/Liquid Coalescing Technology, Today's Refinery, Mar. 1997.

* cited by examiner

SALT DRYING PROCESS

CROSS REFERENCE TO RELATED APPLICATION

This application relates to and claims priority to U.S. Provisional Patent Application No. 60/996,600 filed on Nov. 27, 2007.

FIELD OF THE INVENTION

This invention relates to a method for the drying fluid streams using a salt dryer. The process is useful for drying hydrocarbons streams in petroleum refineries, terminals and other processing plants. It is especially useful for drying liquid hydrocarbons such as petroleum naphthas, natural gas condensates, petroleum fuels such as gasoline, middle distillates such as road diesel fuel and kerojet, at temperatures ranging from low to high ambient.

BACKGROUND OF THE INVENTION

Significant amounts of water become mixed with hydrocarbon streams during production and processing. Petroleum refinery streams, for example, may be treated with water, steam or various aqueous solutions during processing in order to carry out the processing and to meet various quality specifications. Steam stripping, caustic treating and amine treating are frequently used in conventional refinery processing and although much of the water introduced in this way can be removed by simple settling procedures, a certain amount of water remain dissolved in the fuel or entrained in the fuel as small droplets after removal of the bulk of the water. Excess amounts of water frequently adversely affect the properties and quality of hydrocarbon fuels, for example, by creating haze in fuels which would otherwise be clear, accelerating rust and other forms of corrosion on containers and equipment, and by the formation of ice crystals at low temperatures which may lead to plugging of filters and other equipment, for example, fuel lines and injectors. Water may also contain contaminants such as acids which may lead to accelerated corrosion. It is therefore usually necessary to separate any remaining water from petroleum fuels and other products in order to meet various product specifications; the separation may be carried out at the refinery, at the distribution terminal or at the location of use, for example, an airport.

Product specifications frequently require relatively low levels of water in order to avoid the problems mentioned above. For example, even though ASTM D 2709 for diesel fuel oils sets a 0.5% volume maximum limit on water in sediment for diesel fuel oils varying from light distillate fuels for road diesels (1D fuel) up to heavy distillate fuels (4D fuel) for low and medium speed diesels operating at constant speed and load, lower limits are set in normal operation in order to obtain a "clear and bright" product; typically the "free" or undissolved water limit is 2-40 ppm. Similar specifications may be found for other hydrocarbon fuels including motor gasoline and middle distillate products including home heating oil, aviation kerosene and vaporizing oil. Products sold in cold climates are particularly subject to problems arising from the freezing of water and the consequence formation of ice crystals at temperatures below freezing, the problems of product quality control are therefore exacerbated in such climates. Many common carrier specifications require fuels to be visually haze free at reduced temperatures. Liquefied Petroleum Gas Propane and some Natural Gas Liquids (NGL) or gases must have some of the dissolved water removed to meet product specifications or end use performance requirements. For example, propane and mixtures of propane must be dried to about 50% of saturation to pass the ASTM D1835 dryness specification. In cold climates, it is common to require finished fuels to be dehydrated to a sufficient level that water or ice does not phase separate from the fuel as the temperature drops during distribution, storage and use.

The production of petroleum hydrocarbons from subterranean formations may also result in hydrocarbon streams which are contaminated by water, either alone or mixed with other contaminants. While water, e.g. brine, may normally be readily separated from liquid crudes, problems may be encountered with the separation of water from other produced fluids, for example, natural gas condensates which are relatively light, low boiling hydrocarbon fractions produced from natural gas wells. One instance of this problem is in the production of natural gas which has a relatively high water content which leads to undesirable hydrate formation; hydrates normally require removal prior to the shipping of the gas because of their propensity to plug equipment and flowlines. One method for removing water from natural gas streams is by the addition of a dehydrating agent or hydrate suppressor such as ethylene glycol followed by separation of the water/glycol phase from the hydrocarbon liquids in the conventional manner.

An alternative drying method is to use a salt dryer, that is a drying unit which contains a dehydrating solid compound which combines with the water in the gas to from an aqueous solution which can be separated from the gas flowing through the unit. Salt dryers are capable of removing both free water, i.e. water which is suspended in the form of droplets in the hydrocarbon, as well as dissolved water and for this reason, are capable of bringing the residual water content of hydrocarbon streams down to the levels set by product specifications or by processing requirements. Salt dryers typically use dehydrating salts such as sodium chloride, calcium chloride, sodium sulfate, sodium hydroxide, potassium hydroxide, lithium bromide or lithium chloride for this purpose. Of these, the lithium salts are the most effective, being capable of reducing the water content of most hydrocarbon streams to about 10-20% relative saturation level but the lithium salts are expensive and normally the purchase and disposal cost is not warranted in large scale commercial units. Calcium chloride is normally regarded as combining high dehydrating effectiveness with acceptable economics, being able to remove about one unit weight of water for each unit weight of calcium chloride consumed and to reduce the water content to about 50 percent relative saturation. Sodium chloride is cheaper and removes a comparable amount of water per unit weight of salt but only removes the residual water level to about 75 percent relative saturation. Sodium sulfate is slightly more effective in reducing the residual water level (to about 60 percent relative saturation).

While salt dryers are effective at removing water from hydrocarbons, they require the replacement or regeneration of the reagents used in the process and the reagents themselves and their products formed by interaction with the water frequently introduce their own complications in subsequent processing and waste disposal. Because the cost of the reagents is directly proportional to the amount of water in the product, physical methods of separation have normally been preferred in refinery operations since their operational cost is not so directly related to the amount of water which needs to be separated. Dryers are often found in many installations, however, and they are often sufficiently economical in use to justify their retention in service in preference to the installation of newer types units requiring additional capital. It would, however, be desirable to improve their operating efficiency in terms of increasing the volume of water which can be removed by a given amount of salt so as to increase run length and reduce changeout frequency, thereby reducing costs.

Another problem encountered with certain drying salts, especially calcium chloride, is of "bridging" and "channeling". Bridging is the formation of hard, solid bridges between particles of the salt, whether they be pellets, flakes, or in other forms. These bridges impede the proper settling of the bed as salt is consumed, and promote cracks and promote channeling. Channeling is the preferential flow of liquid through cracks, channels and void spaces to the extent that in extreme cases, the path through the salt bed may be reduced to a single channel with a consequent total loss in drying efficiency.

A separation technique which is capable of removing free water is liquid/liquid coalescence. This technique has become commercially attractive in recent years. See, for example, *Refining Details: Advances in Liquid/Liquid Coalescing Technology,* Gardner, Today's Refinery, March 1997. The method of coalescing a liquid suspended in another immiscible phase using a coalescing device frequently referred to as a coalescer, has been found useful for removing liquids both from the gaseous phase as in aerosols and from suspensions of one liquid in another liquid with which it is immiscible but may be soluble to a limited degree. Coalescing devices are particularly effective where the volume of liquid to be removed is small in comparison to the volume of the phase from which it is removed so that the technique is of potential application for the separation of small quantities of free water from hydrocarbon fuels and process streams. Because the coalescer is not, however, capable of removing dissolved water, continued use of salt dryers and other drying methods is still required in order to meet specifications.

SUMMARY OF THE INVENTION

We have now devised a method of operating a salt dryer which is capable of increasing the efficiency of the dryer in terms of amount of water removed per unit weight of drying salt. According to the present invention, water is removed from liquid and gaseous hydrocarbons by contacting a feed stream of the hydrocarbon with an aqueous solution of a salt drying agent prior to passing the stream through a salt dryer to remove part of the water in the stream. The aqueous solution of the salt drying agent is generated in the salt dryer when the partly dried stream comes into contact with the drying salt and forms the solution in one or more stages. The solution is circulated in a loop from the salt dryer to the incoming feed and then through a liquid/liquid coalescer which removes a portion of the water together with dissolved salt from the mixture before the mixture is passed on to the salt dryer where further removal of water occurs.

In this way, the salt dryer is off-loaded by a substantial factor and does not require to remove such a large amount of water; the salt requirements are therefore reduced in proportion to the amount of water removed in the treatment steps which precede the dryer. So, for example, taking calcium chloride as an example, it may be possible to decrease the consumption of salt to just one fourth of the amount if no pre-drying is used, i.e. to four weight units of water removed for the use of one unit of the salt. The use of a coalescer to remove free water/brine—especially slugs of free water/brine helps to protect the salt bed from bridging and channel formation and reduces salt consumption in the dryer.

The present process enables both free and dissolved water to be removed from the stream: although the coalescer removes only the free water, this initial drying enables the aqueous solution which remains to remove additional dissolved water from the stream before contact with the dry salt takes place. In this way, the effectiveness of both drying steps is made more optimal with overall increases in process efficiency and reductions in operating costs. Because the coalescers are relatively compact units, they can normally be readily incorporated into existing unit layouts.

Consistent with the removal of the water during the coalescence/separation, the water concentration of the circulating treating agent/water blend will tend to increase gradually with transfer of the water in the feed to the circulating fluid. This progressive increase in water content can be compensated by controlled addition of salt agent to the recirculating fluid coupled with accumulation of the treating agent/water mixture and continuous or periodic dumping of excess mixture. Alternatively, the circulating mixture may be subjected to continuous or batch regeneration or disposed of in any other way which is convenient and economical. Regeneration of the brine further increases the weight of water removed per unit weight of salt, since regenerated salt solution is recycled, and in the extreme, no salt is consumed. This also eliminates the need to handle solid salt for some applications, since liquid salt solutions can be used for make-up of the circulating salt inventory. This further reduces the cost of operating a salt dryer, since liquid salt solutions are generally less expensive than the higher grade of crystalline salt "walnuts" or "briquettes" that are preferred for salt dryers. If necessary, the water content in the circulating loop may be increased to be further away from saturation and precipitation limits, in order to prevent plugs forming from excessively high salt levels, but still provide sufficient dehydration to meet specifications or end use performance requirements. The concentration of the circulating salt brine can be controlled at any point between saturation (best dehydration) to dilute solution (essentially removing only free water). For example, winter fuel production is generally required to be very dry to prevent ice formation (dehydrated to about 50% relative humidity), whereas summer fuel production in the same location only requires "clear and bright" at summer ambient temperatures (essentially free water removal only). The concentration of the circulating salt brine can therefore be varied seasonally for minimum salt or energy consumption, or the solid salt packed bed dryer could be taken off line during summer operation. Packed bed solid salt dryers alone cannot be controlled in this manner, resulting in more salt consumption than is required for many less critical applications.

DRAWINGS

DETAILED DESCRIPTION

The present invention is applicable to the drying of liquid and gaseous hydrocarbon fluids. The method is particularly applicable to the separation of water from gases such as natural gas as well as light hydrocarbon liquids of relatively low viscosity, comparable to that of water. The method is of particular applicability to the separation of water from liquid refinery streams such as catalytically cracked naphthas, heavy naphthas and to product streams such as gasoline (including heavy gasoline and light gasoline), middle distillates such as home heating oil, vaporizing oil, road diesel including all ASTM D2 diesels, kerosene type aviation fuels, as well as potentially to other liquid hydrocarbon streams which require removal of water in order to meet product specifications or other service or commercial requirements. Normally, the amount of water which is present in these materials prior to separation will be relatively small, typically not more than about 5 volume percent, but product specifications will normally require a much lower water content in order to be acceptable. For example, as noted above, the ASTM standard for D2 diesel fuel requires no more than 0.2% combined water and sediment with lower levels being observed in normal operation for a "clear and bright" product at the temperature of observation and seasonal product specifications may require the test sample to be cooled to a lower temperature to ensure that it will be suitable for use. Similar requirements will be encountered with aviation kerosenes in view of the very low temperatures encountered by military and commercial jet aircraft at high altitudes. The present separation technique is not dependent upon the chemical composition of the hydrocarbon fuel except to the extent that the chemical composition affects physical properties such as specific gravity, interfacial surface tension, miscibility with water and viscosity. The chemical composition may also affect the degree to which surfactants added during processing or spontaneously formed during the processing (for example, during caustic washing) and the effect the surfactants may have on the other properties, especially emulsion stability, micelle formation, reverse micelle formation.

Figure 2:
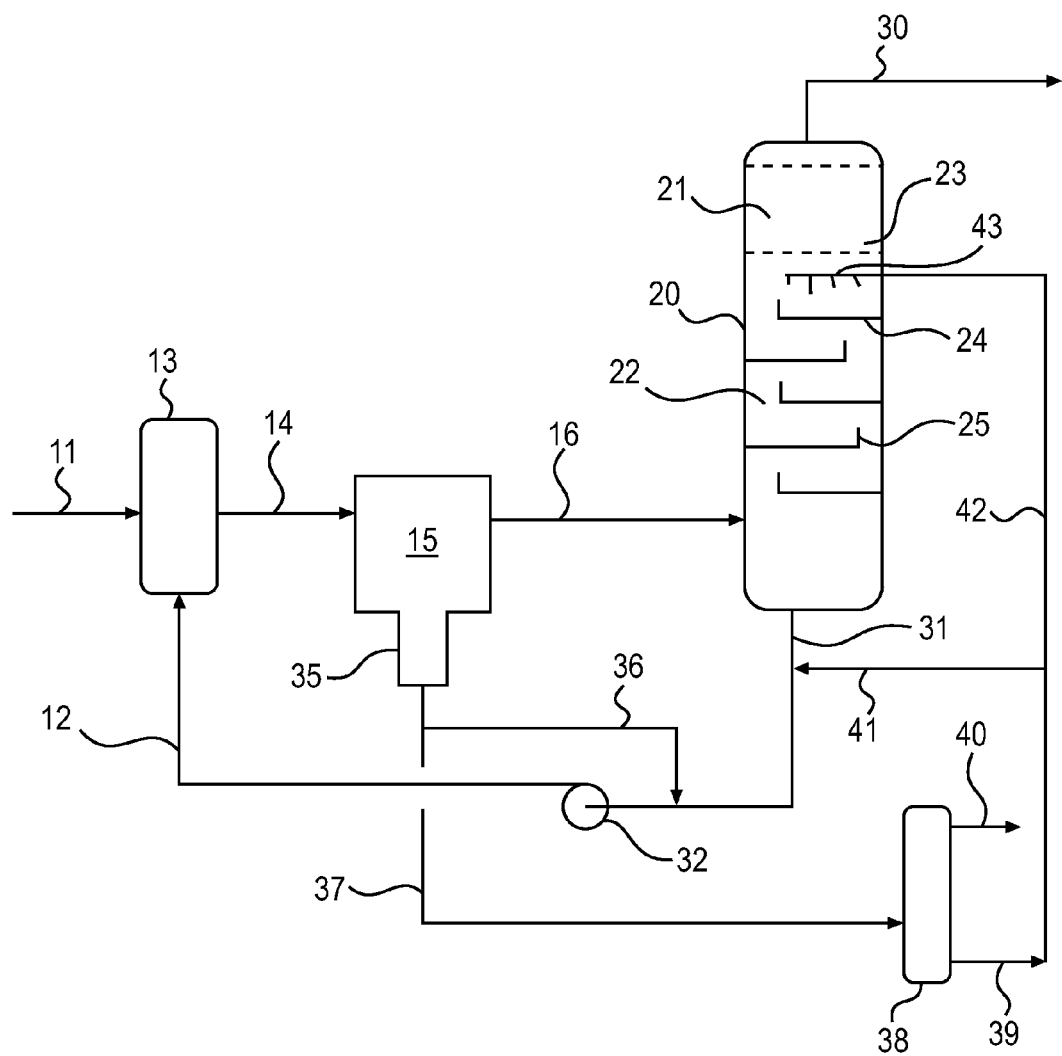
FIG. 2 is a process flow schematic of a salt dryer for a gas stream.

The present method is applicable to the separation of water from natural gas and to natural gas liquids also known as natural gas condensates. These low viscosity hydrocarbon liquids generally comprise propane, butane and possibly higher hydrocarbons separated from the lower boiling methane and ethane in natural gas from subterranean wells. A unit suitable for drying natural gas is shown in FIG. 2.

In the present method, a the hydrocarbon feed which is to be dried is first subjected to an initial dehydration by contact with an aqueous solution of a drying salt such as calcium chloride or sodium chloride. The concentration of the drying salt solute is maintained at a value at which some removal of water from the hydrocarbon stream is effected. The mixture of feed and salt solution is then led to a liquid/coalescer in which the free water is removed to a large extent together with part, for example, 50 percent, of the water dissolved in the feed. The coalesced salt solution (brine) is preferably recirculated to the feed at a rate which is sufficient to obtain good contacting as well as good coalescing performance so as to minimize the amount of brine that goes on to the salt bed. After coalescence, the liquid or gaseous hydrocarbon is fed into the salt dryer where it is dried by contact with the drying salt to form a dried product stream of liquid hydrocarbon or hydrocarbon gas as well as a stream of an aqueous solution of the drying salt which is recirculated to the feed.

Figure 1:
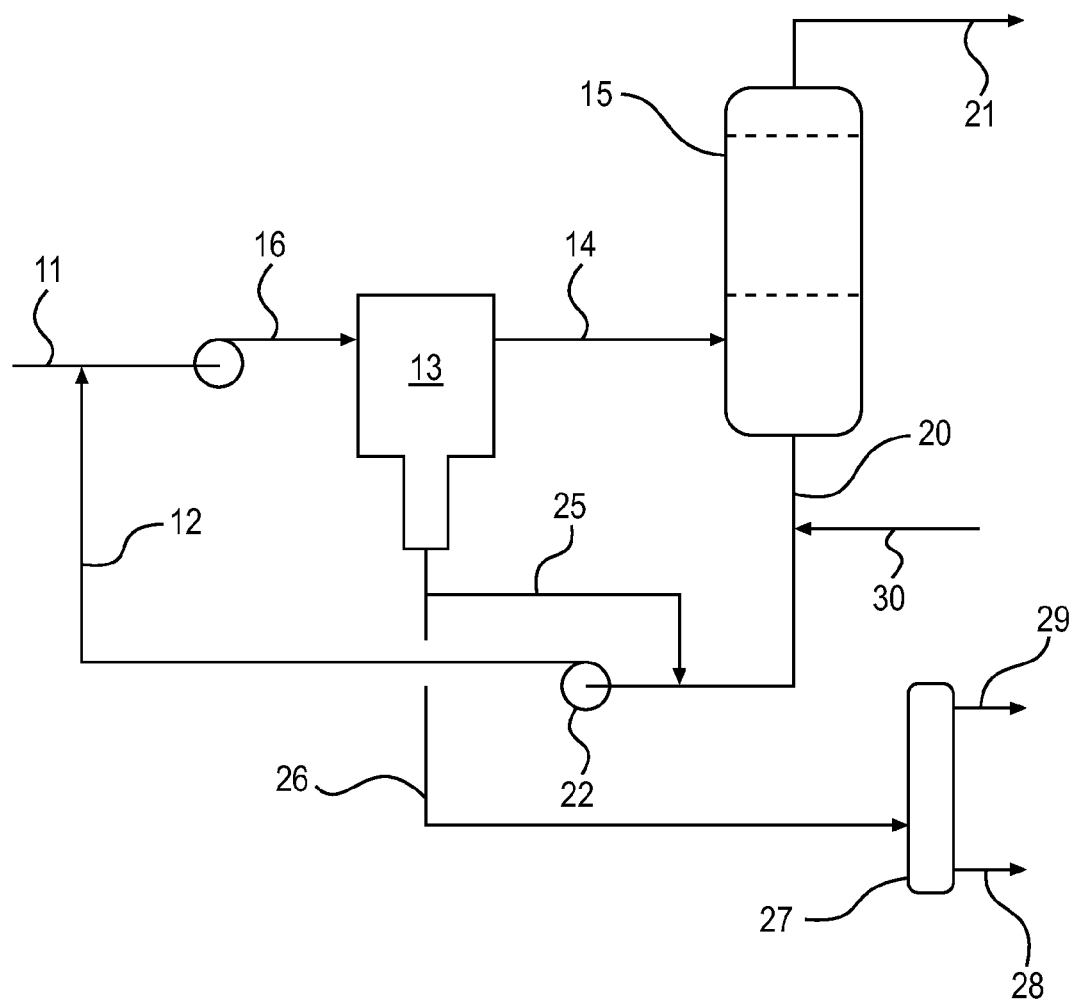
FIG. 1 is a process flow schematic of a salt dryer for a liquid hydrocarbon stream.

In FIG. 1, a liquid refinery fuel such as motor gasoline, cracked naphtha, road diesel or kerojet is introduced by way of line 11. An aqueous solution of a drying salt from line 12 is mixed in with the incoming feed to effect a removal of at least a part of the dissolved water in the hydrocarbon feed. Good liquid/liquid contact with reduction in droplet size is ensured by static mixer 16 or, alternatively, by a mix valve or other suitable contactor. The hydrocarbon/solution mix is then fed into a coalescence/separation unit 13. Coalescer unit 13 is normally divided into two stages, comprising a first or coalescence stage and an optional second or separation stage. In commercial coalescence units, both two-stage and single stage designs are available: in a horizontal single stage design, separation may proceed by gravity while a vertical two-stage design may use a cartridge for separation. In the coalescence stage, the suspended particles of water are subjected to coalescence into larger droplets in the presence of a suitable coalescing medium through which the liquids pass in order to effect the desired coalescence of the water, now with the added salt solution. In the separation stage, the combined fluids pass over a separation membrane which is selected to have a surface energy favoring passage of the hydrocarbon phase through the walls of the separation membrane while excluding the aqueous phase comprising the dissolved salt and the water. The water is from the aqueous solution which is introduced through line 12 as well as water from the incoming hydrocarbon feed. The liquid hydrocarbon, now containing only a reduced proportion of water passes out of the coalescence/separation unit 13 through line 14 to salt dryer vessel 15.

The salt dryer vessel is typically of conventional construction with a grid supporting a bed of the drying salt in particulate form, for example, pellets or flakes, with the hydrocarbon which is to be dried allowed to pass up through the bed between the salt particles. In vessel 15, the partly dried feed comes into contact with the particles of the drying salt which removes both free and dissolved water to form an aqueous solution of the drying salt which passes downwards through the vessel to line 20 through which it leaves. Dried hydrocarbon product leaves the top of vessel 15 through product line 21.

The aqueous solution of the drying salt which passes out of vessel 15 through line 20 has a content of salt which is still capable of removing water from the incoming hydrocarbon feed. Accordingly, this solution is recirculated through pump 22 to return to the incoming feed through line 12 to effect drying of the feed as described above.

The aqueous solution which collects in boot 25 of the liquid/liquid coalescer 15 comprises water from the aqueous solution introduced through line 12 as well as some water removed from the feed. This dilute stream can be used to dilute the stream in line 20 if required, e.g. if the solution removed from the foot of vessel 15 becomes too concentrated, by passing through line 25. Most, however, is withdrawn through line 26 to stripper 27 where water is removed, e.g by steam stripping to from a more concentrated solution of the drying salt as stripper bottoms from line 28 with stripped water leaving through line 29. The concentrated salt stream from line 28 may be used to increase the concentration of the drying salt in the circulating loop by introduction through line 30 either continuously or at controlled intervals. By control of the composition of the circulating fluid stream, e.g. by the addition of more salt and withdrawal of excess water volume in the stripper, it is possible to optimize the drying operation.

FIG. 2 shows a similar unit for drying natural gas or other hydrocarbon gas streams, for example, process gas streams which require a low moisture content for subsequent process operations. The gas is introduced by way of line 11 and mixed with an aqueous solution of a drying salt from line 12 by means of a suitable gas/liquid contactor 13 before passing through line 14 into a coalescence/separation unit 15. Coalescer unit 15 is normally divided into two stages, comprising a first or coalescence stage and a second or separation stage. In the coalescence stage, the suspended droplets of solution and removed water which are suspended in the gas stream are subjected to coalescence into larger droplets in the presence of a suitable coalescing medium through which the liquids pass in order to effect the desired coalescence of the water. In the separation stage, the two phase gas/liquid mixture passes over a separation membrane which is selected to have a surface energy favoring passage of the hydrocarbon phase through the walls of the separation membrane while excluding the aqueous phase comprising the dissolved salt and the water. The gas, now containing only a reduced proportion of water passes out of the coalescence/separation unit 15 through line 16 to salt dryer vessel 20.

The salt dryer vessel has two portions, an upper section 21 and a lower wash section 22. The upper portion 21 lies over an apertured plate 23 which supports a bed of the drying salt in particulate form, for example, pellets or flakes, with the gas which is to be dried allowed to pass up through the bed between the salt particles. The lower wash section 22 of the vessel has a series of vertically spaced trays 24 (only one indicated) each of which has a weir 25 to allow liquid from the tray to spill over the edge and contact uprising gas as it falls to the next tray below. In the top section of the vessel containing the drying salt, the partly dried gas comes into contact with the particles of the drying salt which removes both free and dissolved water to form dried product gas which passes out through line 30. An aqueous solution of the drying salt passes downwards out of top section 21 through the apertured plate 23 into the lower section 22 to descend through this section, contacting the ascending gas in countercurrent as it does so. As this solution is quite highly concentrated, it removes water from the incoming gas before it reaches the dry salt in the upper section of the tower. The gas is therefore pre-dried before it reaches the dry salt so that the drying optimizes salt utilization.

The aqueous solution of the drying salt which passes out of tower 20 through line 31 has a content of salt which is still capable of removing water from the incoming hydrocarbon feed. Accordingly, this solution is recirculated through pump 32 to return to the incoming gas through line 12 to effect drying of the gas as described above.

The aqueous solution which collects in boot 35 of the liquid/liquid coalescer 13 comprises water from the aqueous solution introduced through line 12 as well as some water removed from the incoming gas. This dilute stream can be used to dilute the stream in line 31 if required, e.g. if the solution removed from the foot of vessel 15 becomes too concentrated, by passing through line 36. Most, however, is withdrawn through line 37 to stripper 38 where water is removed, e.g by steam stripping to from a more concentrated solution of the drying salt as stripper bottoms from line 39 with stripped water leaving through line 40. The concentrated salt stream from line 39 may be used to increase the concentration of the drying salt in the circulating loop by introduction through line 41 either continuously or at controlled intervals. By control of the composition of the circulating fluid stream, e.g. by the addition of more salt and withdrawal of excess water volume in the stripper, it is possible to optimize the drying operation. The concentrated salt solution may also be circulated to the top of the lower section 22 of tower 20 through line 42 and sparger 43. In this way, additional concentrated salt solution is provided to remove water from the hydrocarbon before it enters the dry salt section 21 of the tower for a further improvement in operation. Any convenient method for removing the water from the salt solution may be used, for example, evaporation, freezing, or electrolysis.

The drying salts which may be used include the lithium salts such as lithium bromide and lithium chloride, calcium chloride, sodium sulfate, sodium chloride, sodium hydroxide or potassium hydroxide as well as other salts which have a strong affinity for water. For these purposes, solid metal compounds such as sodium and potassium hydroxide which have the required affinity for water are regarded as salts and the term "salt" is used here to include such solid metal compounds which have an affinity for water permitting their use as drying agents. Calcium chloride and sodium chloride will normally be preferred for reasons of economy and availability. For multi stage units different salts may be used in different stages; for example, lithium bromide or lithium chloride might be used in the first stage of a two stage unit in which the first stage has it own salt reclaimer; this would reduce the relative humidity of the gas stream to a level below that achievable with calcium chloride. A downstream salt tower could then be provided as a second stage to act as a guard bed and not consume any salt or produce any brine except during upsets. Reclamation of the more expensive lithium salts in the first stage reclaimer would enable this unit to be operated economically.

The water content of the hydrocarbon stream achieved by the contact between the hydrocarbon and the salt solution is dependent on the equilibrium established between the hydrocarbon and the salt solution. This, in turn, is dependent on the nature of the drying salt as well as on the temperature at which the contact takes place. The following Table 1 shows the equilibrium relative humidity (RH, percent) for natural gas achieved with various saturated salt solutions at differing temperatures; Table 2 shows the RH for calcium and lithium chlorides at various salt concentrations

TABLE 1

Natural Gas RH for Salts/Temperatures

| Salt | Temperature, ° C. | | | | |
|---|---|---|---|---|---|
| | 5.0 | 10.0 | 15.0 | 20.0 | 25.0 |
| Lithium chloride | 11.3 | 11.3 | 11.3 | 11.3 | 11.3 |
| Calcium chloride | 40 | 37 | 34 | 32 | 29 |
| Magnesium chloride | 33.6 | 33.5 | 33.3 | 33.1 | 32.8 |
| Potassium carbonate | 43.1 | 43.1 | 43.1 | 43.2 | 43.2 |
| Sodium bromide | 63.5 | 62.2 | 60.7 | 59.1 | 57.6 |
| Sodium chloride | 75.7 | 75.7 | 75.6 | 75.7 | 75.3 |
| Potassium chloride | 87.7 | 86.8 | 85.9 | 85.1 | 84.3 |
| Potassium sulfate | 98.5 | 98.2 | 97.9 | 97.6 | 97.3 |

TABLE 2

Natural Gas RH at Ca, Li Salt Solution Concentrations

| 10% $CaCl_2$ | 94 |
|---|---|
| 25% $CaCl_2$ | 73 |
| 50% $CaCl_2$ | 22 |
| 10% LiCl | 88 |
| 25% LiCl | 52 |
| 50% LiCl | 10 |

Thus, lower levels of relative humidity are achieved by the use of the salts such as lithium chloride which have a greater affinity for water. Lithium bromide is also favored for this reason. Calcium chloride, although less favorable than lithium chloride, is cheaper and will often be favored for this reason as well as for the fact that it can be purchased commercially as a liquid, reducing handling problems. Calcium chloride may not be favored, however, if high concentrations of naphthenic acids are present in the hydrocarbon as these may lead to the formation of soap scums upon contact with calcium salt solutions; lithium salts, however, form soluble naphthenates and can be used in these instances. The use of caustic drying salts such as sodium hydroxide and potassium hydroxide may be desirable when participation in a reaction is required in addition to the drying function, for example, caustic potash may be used to remove hydrogen sulfide as well as water from the hydrocarbon stream.

The use of the salt solution formed by the dissolution of the solid drying salt in the hydrocarbon is an effective method of dehydration since the amount of residual water in the hydrocarbon at that point is limited so that the solution formed directly from the dry salt is relatively concentrated. If a level of humidity (residual water) lower than the stated relative humidity is all that is required, an unsaturated solution of the relevant salt may be used. The removal of water is the coalescence/separation step clearly helps the drying process here by removing water before the hydrocarbon either comes into contact with the dry salt or the concentrated solution formed from it. The concentrated solution formed from the dry salt is also effective for maintaining the concentration of the salt solution circulating in the loop with the coalescer/separator at a requisite high level for effective dessication.

In terms of separation of two liquid phases, the one from the other, as in FIG. 1, the Gardener article discusses the factors that are relevant to the coalescence of droplets of the discontinuous phase from the continuous phase and the ease or difficulty of separation of the immiscible phases. These factors include the physical properties of the phases such as density, viscosity, surface tension and interfacial tension. In addition, the properties of the system such as drop size, curvature of the liquid/liquid interface, temperature, concentration gradients and vibrations may also affect the effectiveness of the coalescence. As noted in U.S. Pat. No. 5,443,724 (Williamson) any or all of these factors may be significant in a particular situation but the density, drop size and interfacial tension of the two liquids appear to be the most significant factors as well as those over the least amount of control can be exercised in affecting the separations.

With separations of liquid from a gas, as in the configuration of FIG. 2, similar factors will apply although the phase considerations will be naturally different. These factors will, however, be well known and may be determined in accordance with the design of an appropriate gas/liquid coalescer.

The type of coalescer employed for the separation depends on the difficulty of separation or coalescence as influenced by the various relevant factors outlined above. The type of fluids being separated frequently determines the nature of the packing used in the coalescence device. Glass fibers have found widespread industrial application in commercial devices. Frequently, however, the presence of surfactants in water/hydrocarbon emulsions lowers the interfacial tension to a value less than about 20 dynes/cm at which the emulsions are stable enough to resist being broken through processing in conventional mesh packing/glass fiber coalescers as well as by other techniques. While electrostatic precipitators may be effective on such emulsions down to interfacial tensions below 10 dyne/cm, their use is rather less favored than the relatively cheaper coalescence method. Surfactants disarm conventional glass filters coalescers by bonding with glass fibers, allowing water molecules to flow through the coalescers with the hydrocarbons. Frequent changes of the cartridge material in the coalescers may obviate this problem but the increased labor and disposal costs associated with frequent cartridge change out are undesirable as is the continued need to monitor the quality of the product to ensure that appropriate specifications are being met. The use of various polymeric materials such as phenolic or acrylic resins which act primarily as binding agents for glass fiber packings may be effective to reduce disarming of coalescers to a significant extent, but the problem remains.

U.S. Pat. No. 5,443,724 discloses a coalescer-separator apparatus which enables longer coalescer cartridge life to be obtained as a result of improved flow distribution within the device. The device is stated to be particularly suitable for the separation of water from organic liquids such as fuels and is capable of achieving extended life using a more compact unit with the same or improved level of performance compared to larger conventional units. As described in U.S. Pat. No. 5,443,724, the coalescence is carried out using a packing material which has a critical wetting surface energy which is intermediately critical wetting surface tension (CWST) of the discontinuous and continuous phase liquids. This results in the formation of droplets of the discontinuous phase, after which the mixture of the continuous phase liquid and the droplets of the discontinuous liquid are conducted to a separating element which permits the continuous phase liquid (petroleum fuel) to pass but substantially resist or prevent passage of the discontinuous phase which can then be separately collected and taken away from the bulk of the product.

Various porous media with differing surface energies are mentioned in U.S. Pat. No. 5,443,724 including polytetrafluoroethylene (PTFE), polybutyleneteraphalate (PBT) and other polyfluorinated polymers such as fluorinated ethylene and propylene (FEP) resins. These materials which provide the requisite surface energy to the coalescence/separation filters may be used in the form of a coating of a backing such as glass fiber, stainless steel screens or pleated paper packs. Other media suitable for use as the functional or discontinuous phase barrier material of the separating element are disclosed, for example, in U.S. Pat. No. 4,716,074 (Hurley) and U.S. Pat. No. 4,759,782 (Miller); reference is made to these patents for details of suitable materials for providing the requisite surface properties in coalescence/separation devices.

Normally, separation of liquids by the coalescence technique requires three stages to be successful. First of all, filtration is required to remove fine particles such as iron oxide and iron sulfide that stabilize emulsions and for this purpose, mesh, screen, packed and sand filters are normally satisfactory. Filtration is followed by the coalescence step which, in the case of water and hydrocarbon fuels, is normally accomplished by the use of fluoropolymer membranes which are effective emulsion breakers in liquids with an interfacial tension of greater than about 1 dyne/cm. Separation takes place when the coalesced water droplets are repelled by a hydrophobic barrier membrane, again normally formed from a polymeric material such as fluoropolymer, which permits the hydrocarbon fuel to flow through the cartridge while preventing transfer of the water across the membrane.

Prefilters should preferably be used ahead of the coalescer, typically any suitable type of conventional filter, including sand filters (for liquid streams), metal or polymer meshes, or other porous material capable of removing small solid particles which would tend to stabilize the fuel/water emulsions and which might result in damage to the more delicate coalescer membranes. Polyester and nylon mesh filters are suitable, typically with crush strengths in the range of 70-145 kg.cm$^{-2}$ (75-150 psi) and other non-woven filter materials may be used as convenient alternatives. The filter material may be contained in a conventional filter housing and the filter material in any convenient configuration which provides the desired filter life, filtration capacity and flow rate, for example, pleated mats, cylindrical sheets or mats, helical or spirally wound mats.

In a similar manner, the material of the coalescer and separation elements in the coalescing unit and the separation unit may be provided in a form which provides the necessary mechanical strength, liquid flow rate and unit life. In the simplest form, the media serving as the coalescer and separator materials may be provided in sheet form which may be formed either as flat sheets, pleated or corrugated sheets or in other suitable arrangements e.g. cylindrically, helically or spirally wound sheets, as disclosed in U.S. Pat. No. 5,443,724 to which reference is made for a disclosure of suitable liquid/liquid coalescer and separator materials and configurations for them.

The coalescer promotes the coalescence of the discontinuous or highly divided phase of the hydrocarbon/water mixture in which the water is in the form of finely divided droplets which are immiscible with the hydrocarbon phase into larger and coarser droplets. The coalescing material is used in the form of a packing in which the material has a critical wetting surface energy intermediate the surface tensions of the liquids forming the continuous and discontinuous phases, that is, of the hydrocarbon majority component and the water which is to be removed. In practice, this means that the medium needs a surface energy of less than about 72 dynes/cm. Similarly, the material of the separating element is selected so as to have a surface energy which permits passage of the majority hydrocarbon component through the small pores of the separator material but to preclude transfer of the water across the wall. In this case, since water is the discontinuous phase which is to be separated (along with the alcohol/water injected) the separator materials are selected to have a critical surface energy (CWST) below the surface tension of water which is typically about 72 dynes/cm. As disclosed in U.S. Pat. No. 5,443,724, materials preferred for use as the phase barrier material for the separator include silicones, such as silicone treated paper and more preferably fluoropolymeric materials of which fluorocarbons or perfluorocarbons (perfluoro resins) are particularly preferred. Examples of preferred materials for use as the packing or coating in the separator include polytetrafluoroethylene (PTFE) or other polyfluorinated polymers such as fluorinated ethylenepropylene (FEP) resins. As noted, a preferred separator material includes a coating of one of these materials on a stainless steel screen or a pleated paper pack. Other suitable materials include those disclosed in U.S. Pat. No. 4,759,782 to which reference is made for a disclosure of such materials. Generally, the phase barrier material which acts to prevent the discontinuous phase passing through it (and is therefore appropriately referred to as the discontinuous phase barrier material) is selected to have pores smaller than a substantial amount of the droplets of the liquid which forms the discontinuous phase. Typically, the pore size of the functional part of the separator material is selected to be from 5 to 140 microns, preferably 40 to 100 microns. When, as in this case, the discontinuous phase is water, the pore size is preferably approximately 80 microns.

The coalescing unit and the separation unit may suitably be contained in a housing which provides and adequate number of coalescing/separating elements with these elements being suitably arranged inside the housing for reasons of functionality and operating convenience. A suitable arrangement is shown in U.S. Pat. No. 5,443,724, using coalescer and separator cartridge elements arranged in super posed relationship with one another in a cylindrical type housing which permits ready access to the cartridges when they require replacement. However, other configurations may be used and reference is made to commercial suppliers of this equipment including Pall Corporation with recommendations for hydrocarbon separations being available at www.pal.com/applicat/hcp/.

We claim:

1. A method for removing water from a fluid hydrocarbon, which comprises the steps of:
   (i) contacting a feed stream of the hydrocarbon containing water with a stream of a treating agent comprising an aqueous solution of a drying salt having an affinity for water,
   (ii) subjecting the mixture of hydrocarbon and treating agent to coalescence/separation to coalesce the non-hydrocarbon components of the hydrocarbon/water/treating agent mixture to form larger size coalesced liquid droplets and separate the coalesced liquid droplets comprising water and dissolved drying salt from the hydrocarbon by first coalescing the finely divided droplets of the discontinuous aqueous phase of the mixture into larger, coarser droplets by adsorption of droplets on a packing of a coalescence material having a critical wetting surface energy intermediate the surface tensions of the hydrocarbon and of the water in the mixture and then passing the coalesced water droplets and hydrocarbon to a separating element having a surface energy which permits transfer of the hydrocarbon through the pores of the separator material while precluding passage of the coalesced water droplets to form a partly dried hydrocarbon stream and a separated water stream which is an aqueous solution of the drying salt,
   (iii) contacting the partly dried hydrocarbon stream with a solid drying salt having an affinity for water to form a dried hydrocarbon product stream and the stream of the aqueous solution of the drying salt by dissolution of the solid drying salt in water contained in the partly dried hydrocarbon stream,
   (iv) recirculating the aqueous solution of the solid drying salt formed in step (iii) to contact the feed stream of the hydrocarbon in step (i).

2. A method according to claim 1 in which the water concentration of the recirculating aqueous solution of step (iv) gradually increases with removal of the water from the feed.

3. A method according to claim 2 in which the composition of the recirculating aqueous solution in step (iv) is controlled to achieve the requisite level of water removal for the partly dried hydrocarbon stream by mixing the aqueous solution of the drying salt with the separated water stream formed by the coalescence/separation step (ii).

4. A method according to claim 1 in which the separated water stream of the coalesced liquid droplets from the coalescence/separation step (ii) is concentrated to form a concentrated drying salt solution stream.

5. A method according to claim 4 in which the concentrated drying salt solution stream is circulated to the stream of the aqueous solution of the drying salt formed in step (iii) by the dissolution of the solid drying salt in the water from the partly dried hydrocarbon stream.

6. A method according to claim 1 in which the hydrocarbon is a gaseous hydrocarbon.

7. A method according to claim 6 in which the partly dried gaseous hydrocarbon product from the coalescence/separation step is contacted with a stream of an aqueous solution of the drying salt.

8. A method according to claim 7 in which the partly dried gaseous hydrocarbon product from the coalescence/separation step is contacted in countercurrent with a stream of an aqueous solution of the drying salt.

9. A method according to claim 1 in which the drying salt comprises sodium chloride.

10. A method according to claim 1 in which the drying salt comprises calcium chloride.

11. A method for removing water from a liquid hydrocarbon, which comprises the steps of:
   (i) contacting a feed stream of the liquid hydrocarbon with a stream of a treating agent of an aqueous salt solution of a drying salt having an affinity for water, to remove water from the hydrocarbon and form a mixture of (i) the hydrocarbon and (ii) the treating agent with water removed from the hydrocarbon,
   (ii) subjecting the mixture of hydrocarbon and treating agent to coalescence/separation by first coalescing the finely divided droplets of the discontinuous aqueous phase of the mixture into larger, coarser droplets by adsorption of droplets on a packing of a coalescence material having a critical wetting surface energy intermediate the surface tensions of the hydrocarbon and of the water in the mixture to coalesce the non-hydrocarbon components of the hydrocarbon/treating agent mixture to form larger size coalesced liquid droplets of the treating agent with water removed from the hydrocarbon,
   (iii) separating the coalesced liquid droplets comprising water and dissolved drying salt by passing the coalesced water droplets and hydrocarbon to a separating element having a surface energy which permits transfer of the hydrocarbon through the pores of the separator material while precluding passage of the coalesced water droplets to form a partly dried hydrocarbon stream and a second salt solution stream,
   (iv) contacting the partly dried hydrocarbon product with a solid drying salt having an affinity for water to form a dried hydrocarbon product and a third salt solution stream,
   (v) circulating the second salt solution stream (from step (iii) to contact the feed stream of the liquid hydrocarbon in step (i).

12. A method according to claim 11 in which the third salt solution formed in step (iv) is combined with the second salt solution formed in step (iii) prior to contacting with the liquid hydrocarbon feed stream in step (i).

13. A method according to claim 11 in which the drying salt comprises sodium chloride or calcium chloride.

14. A method for removing water from a gaseous hydrocarbon, which comprises the steps of:
   (i) contacting a feed stream of the gaseous hydrocarbon with a stream of a treating agent comprising an aqueous salt solution of a drying salt having an affinity for water, to form a stream of a mixture of the hydrocarbon and the salt solution,
   (ii) subjecting the mixture of hydrocarbon and the salt solution to coalescence/separation by first coalescing the finely divided droplets of the discontinuous aqueous phase of the mixture into larger, coarser droplets by adsorption of droplets on a packing of a coalescence material having a critical wetting surface energy intermediate the surface tensions of the hydrocarbon and of the water in the mixture to coalesce the non-hydrocarbon components of the mixture to form larger size coalesced liquid droplets of the salt solution with water removed from the hydrocarbon,
   (iii) separating the coalesced liquid droplets comprising dissolved drying salt and water by passing the coalesced water droplets and hydrocarbon to a separating element having a surface energy which permits transfer of the hydrocarbon through the pores of the separator material while precluding passage of the coalesced water droplets to form a partly dried gaseous hydrocarbon stream and a second salt solution stream,
   (iv) contacting the partly dried gaseous hydrocarbon product stream in countercurrent with a third salt solution of the drying salt to form a gaseous hydrocarbon product stream having a reduced content of water and a fourth salt solution stream comprising an aqueous solution of the drying salt and water removed from the partly dried hydrocarbon product stream,
   (v) contacting the gaseous hydrocarbon product stream having the reduced content of water with solid drying salt to further dry the gaseous hydrocarbon product stream and form a fifth salt solution from removal of water from the hydrocarbon product stream by the solid drying salt, and
   (vi) circulating the fourth salt solution stream of step (iv) to contact the feed stream of the gaseous hydrocarbon in step (i).

15. A method according to claim 14 in which a sixth salt solution stream is generated by concentrating the second salt solution stream formed in step (iii).

16. A method according to claim 15 in which the sixth salt solution stream is passed with the third salt solution stream formed in step (iv) in countercurrent with the partly dried gaseous hydrocarbon product.

17. A method according to claim 15 in which the sixth salt solution stream is mixed with the fourth salt solution stream formed in step (iv).

18. A method according to claim 14 in which the drying salt comprises sodium chloride.

19. A method according to claim 14 in which the drying salt comprises calcium chloride.

* * * * *